United States Patent [19]

Moore

[11] 4,388,680

[45] Jun. 14, 1983

[54] LUMINAIRE FOR ROADWAY LIGHTING

[75] Inventor: William C. Moore, Memphis, Tenn.

[73] Assignee: International Telephone and Telegraph Corporation, New York, N.Y.

[21] Appl. No.: 216,135

[22] Filed: Dec. 15, 1980

[51] Int. Cl.[3] ............................................... B60Q 1/00

[52] U.S. Cl. .................................... 362/368; 362/145; 362/371; 362/375; 362/431

[58] Field of Search ............... 362/145, 263, 371, 310, 362/311, 374, 375, 431, 368

[56] References Cited

U.S. PATENT DOCUMENTS

| | | | |
|---|---|---|---|
| 3,661,685 | 5/1972 | Osteen | 362/431 |
| 3,761,781 | 9/1973 | Dean | 362/374 |
| 4,138,716 | 2/1979 | Muhlethaler | 362/375 |

*Primary Examiner*—Donald P. Walsh

*Attorney, Agent, or Firm*—James B. Raden; Marvin M. Chaban

[57] ABSTRACT

A luminaire of otherwise conventional design for street or roadway outdoor lighting which employs as its structural housing, members fabricated of suitable plastic material. The slipfitter structure and the base member on which the weighty electrical components are mounted is made of material having superior tensile strength such as cast aluminum. The aluminum base member is fitted closely and secured to the plastic housing. Thus, the portion of the luminaire most subject to stresses is aluminum while for the larger exterior areas suitable molded plastic may be used. The contours of the aluminum base member form an arched structure for supporting the comparative light weight but physically bulky upper plastic housing. By this construction, the plastic housings are placed in compression but all tensile forces are applied to the base member. In this way the plastic housing merely forms a protective shroud for the luminaire.

5 Claims, 16 Drawing Figures

LUMINAIRE FOR ROADWAY LIGHTING

BACKGROUND OF THE INVENTION

Horizontal outdoor luminaires are well-known in the art. Such luminaires traditionally are made of cast aluminum construction and therefore have considerable weight. In addition, where such luminaires employ high intensity light sources, transformer or ballast and other power pad or power control components must be mounted within the respective luminaires. The power components such as ballast transformer are heavy in weight requiring such safety devices as that shown by U.S. Pat. No. 3,761,781 to J. R. Dean issued Sept. 25, 1973.

Typically horizontal luminaires for roadway lighting extend 25–40 inches from their mounting on the horizontal mast, and the luminaires fully assembled may weight in the range of thirty to sixty pounds.

In some of these luminaires, the power components are mounted on a pivotal door (U.S. Pat. No. 3,398,291 issued Aug. 20, 1968 and U.S. Pat. No. 3,353,015 issued Nov. 14, 1967).

Specifications for luminaires of this type require that the luminaire have an effective life of fifteen years under the normal operating conditions to which it is exposed in use.

With the development of engineering grade plastics or high impact plastics especially such plastics as glass filled polycarbonates, polyesters and nylons, the question has been raised as to why these plastics could not be used to replace the cast aluminum housings for luminaires. However, such plastics are known to creep in tension especially when subjected to temperature extremes and continuous vibration and therefore can not meet the operating specifications for the luminaires. In attempts to develop a plastic housing, suitable for a luminaire, many problems arose due to the drooping or creeping of the luminaires relative to its slipfitter mount, as a result of the weight of the power components, within the wide temperature ranges and vibrational forces to which the luminaire was exposed.

SUMMARY OF THE INVENTION

The present invention is directed to a horizontal luminaire of the type used for roadway lighting using suitable plastics for the external housings of the luminaire.

It is an object of the invention to provide a horizontal, outdoor luminaire of the type requiring a ballast power supply in which the exterior housings are molded of engineering plastic and in which the ballast and luminaire mounting are supported on an internal base of greater tensile strength than plastic, the base being fabricated of metal such as cast aluminum.

It is a further object of the invention to provide a luminaire for electric discharge lamp use for which the external housings are fabricated of suitable plastic material and in which the load bearing elements of the luminaire are supported by a metal insert or base member capable of withstanding the tensile and torsional forces imposed by the weight of the luminaire and its power apparatus.

It is a still further object of the invention to provide a luminaire for roadway lighting of the horizontal mast type, in which the outer appearance members are all molded plastic while the load of the luminaire is primarily born by a metal insert secured to one housing and shaped as close to the shape of that housing as is feasible.

The present invention is directed to a luminaire of the type generally shown by the previously cited Dean U.S. Pat. No. 3,761,781. In that patent there is an upper housing of suitable material such as cast aluminum which forms the top, side and front closure of the appearance structure. The upper housing mounts to the horizontal mast and the upper housing supports the ballast and other electrical power components. Hinged to the upper housing at the rear is a lower housing which provides the bottom of the appearance structure, the lower housing also acting to support the refractor. By opening the lower housing, the mast mounting and power components may be exposed for maintenance, replacement of parts and the like.

In the present invention, both the upper and lower housings are molded of suitable engineering or high impact plastic such as aromatic polycarbonates, polyester, nylon or structural foamed plastics. The external surfaces are suitably finished to protect against the effects of ultraviolet light. The upper housing has at its rear, a load bearing insert or internal base member of a material such as aluminum which has superior tensile properties. The insert or base is secured to the mast by conventional clamps and the base has secured thereto the power components including ballast. The insert is arched to conform to the shape of the inside of the upper housing as close as is possible to distribute the housing weight over the entire insert. The arched configuration of the insert also produces superior tensile and torsional strength within the insert and its appendant upper housing.

In this way, the metal insert becomes the stress bearing member which may be placed in tension and torsion while the exterior appearance housing is generally placed in compression in its joinder to the insert. The plastic upper housing carries a minimum of weight including the source lamp and the lower housing carries only the comparatively light weight refractor. The upper housing primarily serves as the weatherproof protective shroud for the luminaire.

In the plastic upper housing, reinforcements are provided such as peripheral stiffeners, and cross ribs. Bosses are used in the housing to eliminate the need for through bolts and minimize the weight of the housing.

DETAILED DESCRIPTION OF THE DRAWINGS

Figure 1:
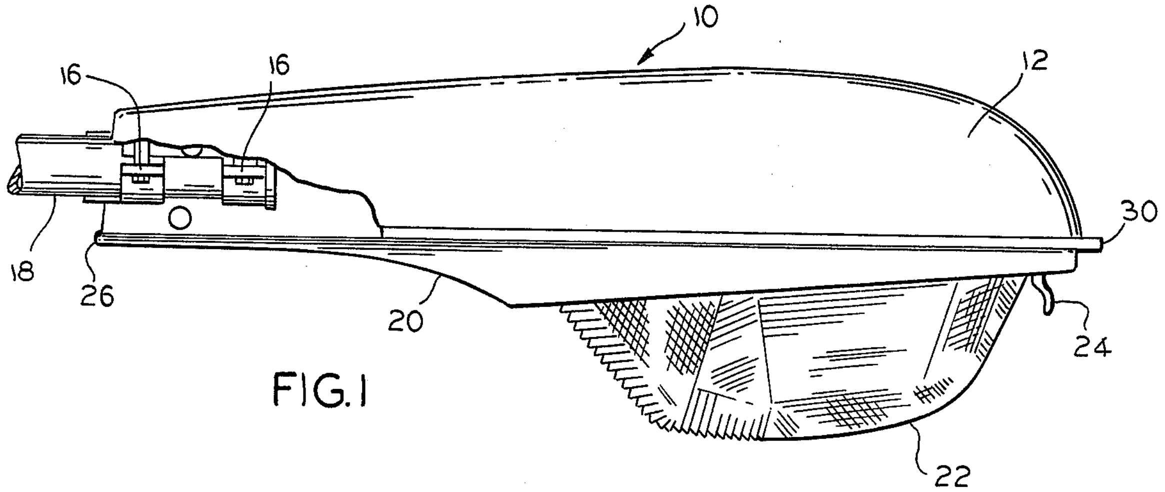
FIG. 1 is a side view in elevation of a luminaire employing my invention, the luminaire being partially broken away to show the interior thereof.

In FIG. 1, I show a side view in elevation of a luminaire 10 for horizontal mounting, the luminaire being generally conventional in shape. The luminaire has an upper housing 12 which through the intermediance of an a base insert 14 is clamped by suitable clamps 16 to the horizontal mast 18. Hinged to the upper housing 12 at the mast or rear end is a lower housing 20 which serves hingedly to support the refractor 22 in its normal closed position. At its front end, the lower housing is latched to the upper housing by a releasable latch 24. By releasing the latch, the lower housing end refractor pivot about the hinge 26 to their open position allowing access to the interior of the luminaire. With the exception of the base insert, The luminaire as described to this point is generally conventional.

In the conventional luminaire of cast aluminum, the housings are of sufficient strength to meet the operating specifications designed to allow the luminaire to withstand fifteen years of normal outdoor use. To simulate the normal use, a luminaire is tested at the extremes of the temperature range which can be expected, i.e. +120° F. and −40° F. The luminaires are also vibrated at a resonant frequency for 100,000 cycles.

For the present invention, the upper and lower housings preferably are fabricated of a molded engineering plastic such as polycarbonate, polyester, or nylon. The external shapes of the two housings are generally similar to the shapes of conventional housings, except that a stiffening rib or flange 30 extends about the periphery of the upper housing opening. The rib 30, as the name implies, provides a reinforcing or stiffening effect about the housing.

Figure 2:
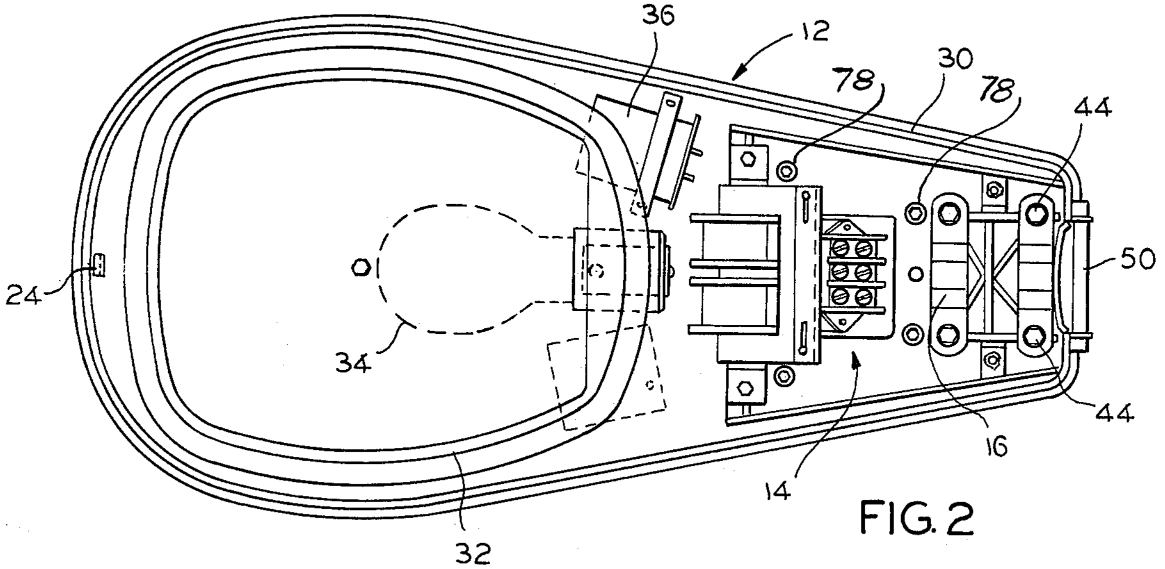
FIG. 2 is a bottom plan view of the luminaire of FIG. 1 with the lower housing removed to show the luminaire interior.

FIG. 2 shows the interior of the upper housing 12, with its latch mechanism 24 at the free end and a conventional reflector 32 mounted in the upper housing. A lamp 34 and capacitor 36 are also shown secured to the upper housing. Secured to the upper housing within the concave interior of the upper housing adjacent the opening 38 for the slipfitter mast 18 is the insert 14. This insert shown in detail in FIGS. 5–12 is fabricated of a high tensile material such as cast aluminum. This insert 14 serves to support the luminaire from the support mast 18, supports the upper housing for a critical portion of its horizontal length and carries the weight of the ballast transformer 42.

Shown also in FIGS. 1 and 2 are the clamps 16 which may be conventional two hole slipfitter clamping straps spaced apart a distance (approx. 2½") within the matching concavity of the insert 14 by means of bolts 44, as will be explained more fully.

Figure 3:
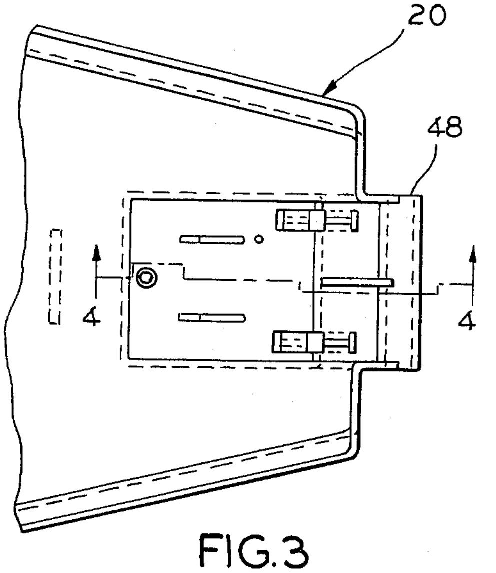
FIG. 3 is a plan view of the rear portion of the lower housing of FIG. 1.
Figure 4:
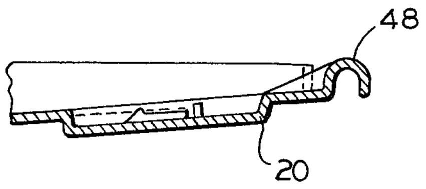
FIG. 4 is a side view in elevation of the lower housing portion of FIG. 3.

In FIGS. 3 and 4, I show the end structure of the lower housings 20 by which the lower housing is hinged to the upper housing in the manner shown by U.S. Pat. No. 4,200,905 issued Apr. 29, 1980 to B. Shelby and myself. As in the cited patent, the lower housing 20 has a hook member 48 which mates with and is held by a horizontal hinge pin 50 of the upper housing. A wire-spring retainer (not shown) or its equivalent may be used to hold the hook to pin connection in a releasable manner as explained by the cited patent.

Figure 5:
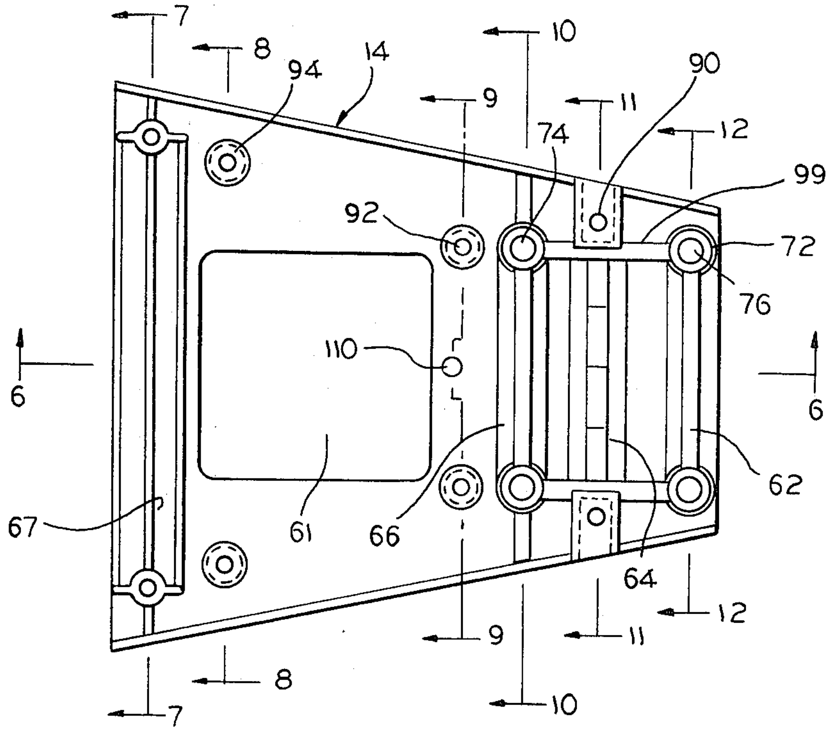
FIG. 5 is a plan view of the base insert of FIG. 2 viewed in the same direction as viewed in FIG. 2.
Figure 6:
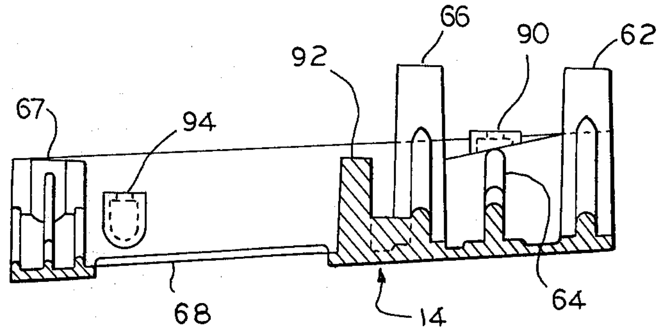
FIG. 6 is a sectional view of the base insert viewed along line 6—6 of FIG. 5.

FIGS. 5 and 6 show the base insert 14 of FIG. 2 in greater detail. As mentioned, the insert is fabricated of a material of tensile strength sufficient to withstand the weight supporting and ambient forces applied to a luminaire as mounted on a pole. I have found that a die cast aluminum alloy 380–384 having a wall thickness of approximately 0.10" performs satisfactorily as material for the base insert.

The base insert 14 is concave or arched as seen best in the sectional views of FIGS. 7–12 with relatively thick cross sectional transversely ridged areas 62, 64, and 66 at the mounting end and having a further set of transverse, spaced ridged areas 67 adjacent the inward end of the base insert. The central area of the base insert may have an opening or cutout 68 to accept a photocell.

At its mounting end as seen in FIGS. 5 and 6 the insert is shaped to receive the standard mounting mast (FIGS. 10 and 12) which may have a diameter of from 1.66 to 2⅜ inches. On both lateral sides of the ridged arcuate areas 62 and 66, the insert has respective vertically elongated pairs of bosses 72 and 74 with screw or bolt receiving sockets 76 cast in the bosses. For mounting on a pole or mast, the sockets 76 receive mounting bolts 44, which may be thread rolling bolts so that there is no need for threading the sockets 76.

Midway between the ridged sections 62 and 66, the intermediate ridged insert section 64 acts as a rocker or fulcrum for the mast. The surface of the rocker wall section 64 (FIG. 11), is formed of linear surfaces angled from one another to provide two holding points along the wall section of the luminaire to be set by resting the mast against ridged section 64 and either section 62 or 66 and thereafter clamping the luminaire in place by lightening the holding bolts on clamps 16.

Figure 13:
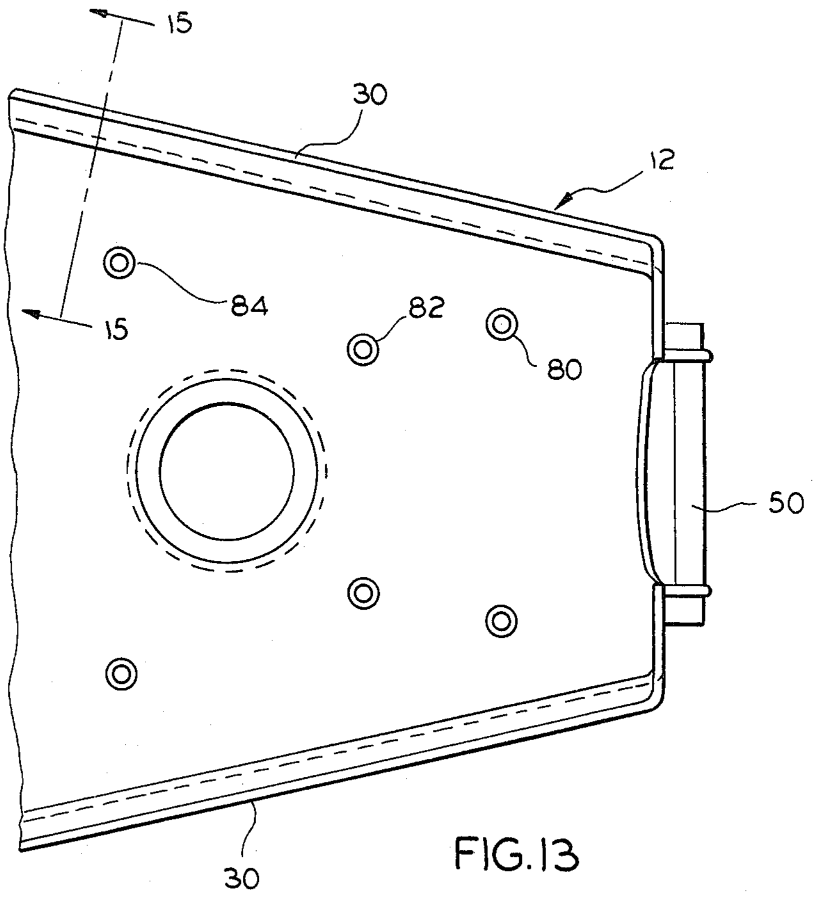
FIG. 13 is a bottom plan view of the rear portion of the upper housing viewed as in FIG. 2.
Figure 14:
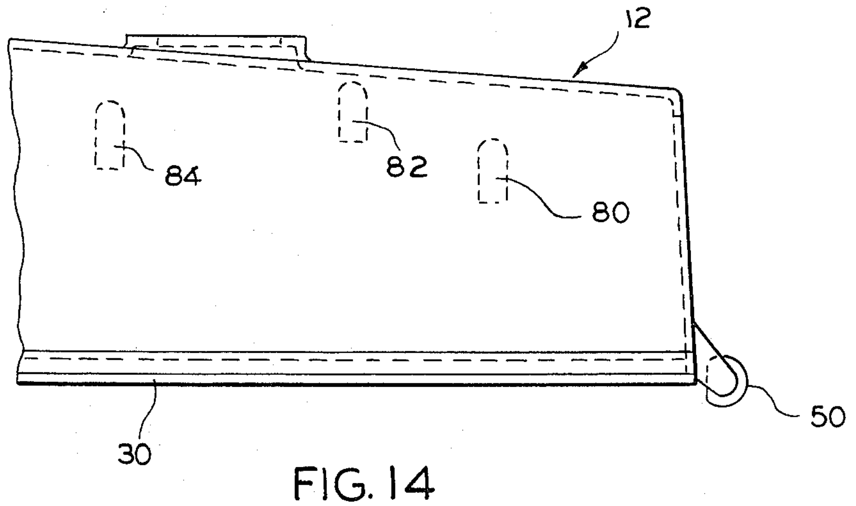
FIG. 14 is a sectional view taken along line 14—14 of FIG. 13.
Figure 15:
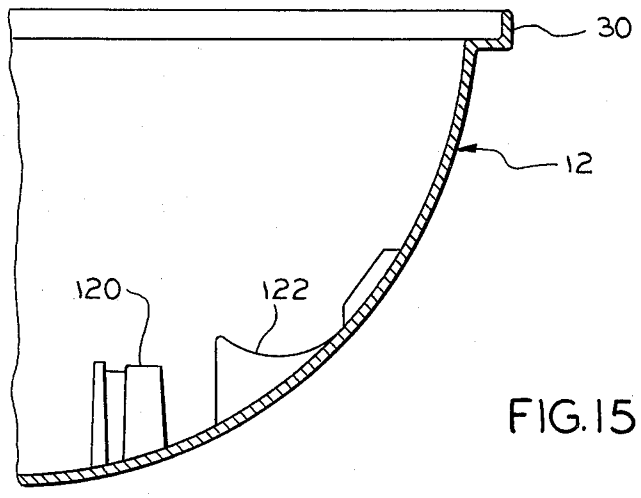
FIG. 15 is a sectional viewed along line 15—15 of FIG. 13.

The base insert 14 is suitably bolted to the upper housing 12 by the use of bolts 78. Three such pairs of bolts are used, at longitudinally spaced areas along the insert. As seen in FIGS. 14 and 15, pairs of bosses 80, 82 and 84 are provided in the upper housing to receive the bolts after the bolts have passed through the clearance openings in the insert tabs. These bosses rest on the tab areas 90, 92 and 94 and of the insert, shown respectively in FIGS. 11, 9 and 8. Self-tapping or thread rolling bolts (seen only in FIG. 1) are used to secure the insert to the plastic upper housing. The location of the upper housing bosses can also be seen in FIGS. 13 and 14. The upper housing essentially rests on the base insert so the bolts and especially the receiving bosses in the upper housing are not subjected to tensile forces.

Extending across the insert in the slipfitter or mast mounting area are the transverse reinforcing ridges 62, 64, and 66. Raised longitudinal ridges 99 on both sides also provide reinforcement and added strength to the insert casing.

Figure 7:
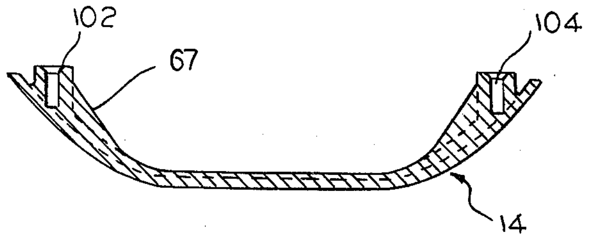
FIGS. 7-12 are section views viewed along lines 7—7-12—12 respectively of FIG. 5.
Figure 8:
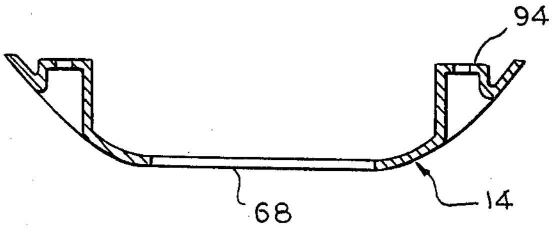
Figure 9:
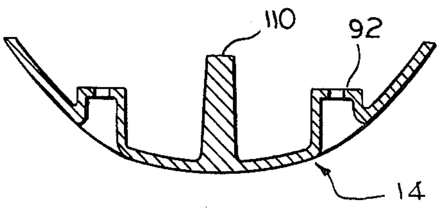
Figure 10:
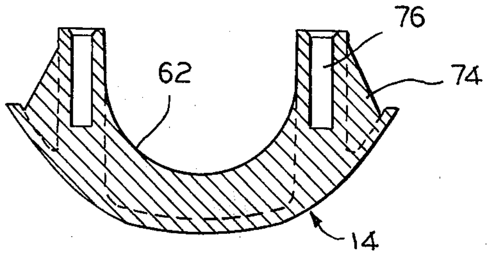
Figure 11:
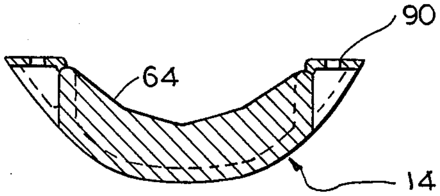
Figure 12:
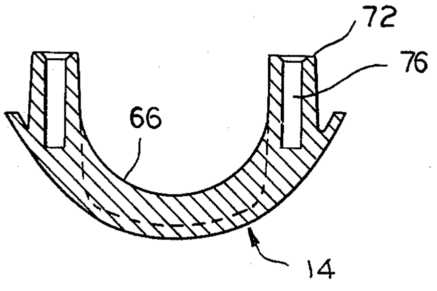

Additionally, the ballast transformer 42 is mounted to the insert 14 at the bosses 102 seen best in FIG. 7. The bosses 102 have sockets 104 for receiving the ballast mounting bolts.

The insert also provides a vertical stop pillar 110 inwardly spaced from the inner clamping area (FIG. 9) to prevent the mast from penetrating too deeply into the upper housing or luminaire cavity.

Figure 16:
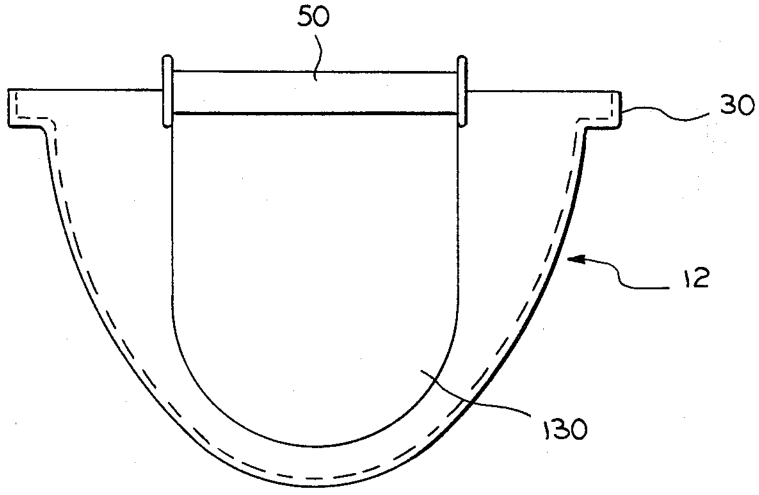
FIG. 16 is an end view of the upper housing viewed from the mounting end and inverted from the position of FIG. 1.

FIGS. 15 and 16 show the curvature and general contours of the upper housing 12 (inverted). In both figures, the reinforcing peripheral flange 30 can be seen. In FIG. 15, the boss 120 and arcuate boss 122 used to mount and hold the capacitor (36 of FIG. 1) are shown.

In the rear end view of the upper housing of FIG. 16, I show the slipfitter opening 130 in the end of the upper housing. Also, there can be seen the hinge pin 50 used for hinging the lower housing.

The insert of FIGS. 5–12 fits into the concavity of the upper housing and closely matches the interior contours of the housing. The insert tabs 90 and 92 abut and rest against the bosses 130 of the housing to spread any load bearing over as large a surface as is possible with the insert size. The shape of the upper housing which is generally a half section of a cone concentrates the stress on the housing to a focal point above the base insert and generally over cutout 68.

I have found that by supporting all appreciable loads by metal to metal mounting, and mounting all weights of an appreciable amount on metal parts, the resulting luminaire can withstand the temperature variances expected of luminaires exposed to ambient outdoor surroundings.

Previously, I had found that any support of plastic on plastic even with through bolts would not meet the specifications adapted to meet operating conditions. The expected combination of weight and vibration and its temperature variation conditions from 40° F. to +120° F. can be met by a luminaire using the design set forth herein.

Preferably the outer surfaces of the plastic material may be finished with paint to protect the unit against deterioration due to ultraviolet light.

I claim:

1. An outdoor luminaire comprising an upper and a lower housing joined to enclose a central cavity having an illuminating lamp on an essentially horizontal axis with said luminaire adapted for mounting on a substantially horizontal axis, cylindrical mast; said upper and lower housings being fabricated of plastic material; a load bearing insert of greater tensile strength than the plastic material of said housings extending within said cavity from a mounting to said mast adjacent one end of said luminaire to the insert termination intermediately within the luminaire; said insert having an arcuate outer wall closely conforming to the shape of a section of the inner wall of said upper housing adjacent thereto with the inner wall of the upper housing adapted to rest on the outer wall of the insert; said insert including a concave inner wall with a plurality of transverse reinforcing ribs and means for securing on said insert components of said luminaire, a plurality of embosses in the inner wall of the upper housing for receiving bolts for securing the insert to rest on said upper housing, a reflector within said housing affixed to the upper housing to reflect light generated by said lamp with said insert termination spaced and externally from the reflector.

2. An outdoor luminaire as claimed in claim 1 in which said insert comprises an aluminum casting with a wall thicknes of at least 0.10".

3. An outdoor luminaire as claimed in claim 1, in which there are longitudinal tabs on said insert abutting against bosses of said plurality of embosses to spread the load of the housing over the surface of the insert.

4. An outdoor luminaire for roadway lighting adapted to mount and extend away from a generally horizontally disposed mast, said luminaire including an upper and a lower housing enclosing the internal components of the luminaire comprising a horizontal axis lamp and a reflector positioned above the lamp to reflect light therefrom for transmission through a refractor in said lower housing, the invention in which both said housings are fabricated of plastic and in which there is a load bearing insert secured in said luminaire at the mounting end thereof, said insert including structure for mounting said luminaire on said mast and means adjacent the opposite end thereof for supporting luminaire components, said insert comprising a section of substantially frusto conic shape with the exterior of the section adapted to conform closely to the interior contour of the upper housing adjacent thereto, and means in said upper housing for securing said insert to said upper housing to enable the portion of the luminaire externally of the optical area of the luminaire to rest on said insert and be supported thereon.

5. An outdoor luminiare as claimed in claim 4, in which said insert comprises an aluminum structure with reinforcing ribs along its interior face.

* * * * *